US011258847B1

(12) United States Patent
Rhodes et al.

(10) Patent No.: US 11,258,847 B1
(45) Date of Patent: Feb. 22, 2022

(54) ASSIGNMENTS OF INCOMING REQUESTS TO SERVERS IN COMPUTING CLUSTERS AND OTHER ENVIRONMENTS

(71) Applicant: ServiceNow, Inc., Santa Clara, CA (US)

(72) Inventors: Scott Michael Rhodes, Torrance, CA (US); Parul Upadhyaya, Santa Clara, CA (US); Harish Kumar Balachandra Bellamane, San Jose, CA (US); Arun Shivaramakrishna, Sunnyvale, CA (US); Prithvi Yoganand, Dublin, CA (US); Surabhi Seetharam, Milpitas, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/086,986

(22) Filed: Nov. 2, 2020

(51) Int. Cl.
*G06F 15/16* (2006.01)
*H04L 67/1008* (2022.01)
(Continued)

(52) U.S. Cl.
CPC ......... *H04L 67/1008* (2013.01); *H04L 67/42* (2013.01); *H04M 3/5232* (2013.01)

(58) Field of Classification Search
CPC . H04L 41/12; H04L 41/0803; H04L 41/0806; H04L 41/0816; H04L 41/5058; H04L 67/16; H04L 67/325; G06F 11/0709
(Continued)

(56) References Cited

U.S. PATENT DOCUMENTS 4,941,084 A   7/1990 Terada et al.
5,185,860 A   2/1993 Wu
(Continued)

FOREIGN PATENT DOCUMENTS

EP   0433979    6/1991
EP   1607824   12/2005
(Continued)

OTHER PUBLICATIONS

U.S. Appl. No. 15/890,014, filed Feb. 6, 2018.
(Continued)

*Primary Examiner* — Wing F Chan
*Assistant Examiner* — Andrew Woo
(74) *Attorney, Agent, or Firm* — McDonnell Boehnen Hulbert & Berghoff LLP

(57) ABSTRACT

An embodiment may involve persistent storage containing definitions of a set of queues and a set of servers, and wherein the servers are respectively associated with deactivation times. One or more processors may be configured to: (i) identify, by an assignment engine, an incoming request in a particular queue, wherein the incoming request is ready for assignment to one of the servers; (ii) determine, by the assignment engine and based on data associated with the incoming request, an expected duration for servicing of the incoming request; (iii) calculate, by the assignment engine and based on the deactivation times, times remaining in service for each of the servers; (iv) select, by the assignment engine and from the servers, a particular server that has a time remaining that is greater than the expected duration; and (v) assign, by the assignment engine, the incoming request to the particular server.

20 Claims, 14 Drawing Sheets

(51) Int. Cl.
*H04M 3/523* (2006.01)
*H04L 67/01* (2022.01)

(58) Field of Classification Search
USPC .................................................. 709/201, 203
See application file for complete search history.

(56) References Cited

U.S. PATENT DOCUMENTS

| | | | |
|---|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,098,555 B2 | 8/2015 | Bjork et al. |
| 10,079,730 B2 | 9/2018 | Subramanian et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0083477 A1* | 4/2007 | Bolle ..................... G06Q 20/06 |
| | | 705/65 |
| 2007/0130313 A1* | 6/2007 | King ................... H04L 67/2819 |
| | | 709/223 |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2012/0016706 A1 | 1/2012 | Pargaonkar et al. |
| 2013/0346347 A1* | 12/2013 | Patterson ............... G06N 20/00 |
| | | 706/12 |
| 2017/0103360 A1* | 4/2017 | Ristock .................. H04L 67/42 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

U.S. Appl. No. 16/116,679, filed Aug. 29, 2018.
U.S. Appl. No. 16/248,578, filed Jan. 15, 2019.
U.S. Appl. No. 16/356,246, filed Mar. 18, 2019.
U.S. Appl. No. 16/709,708, filed Dec. 10, 2019.

\* cited by examiner

ASSIGNMENT RULE
VIP CHAT QUEUE

[UPDATE] [DELETE]

1002

1004

NAME: [VIP CHAT QUEUE]

SHORT DESCRIPTION: [HOW SERVER ASSIGNMENTS ARE MADE FOR THE VIP CHAT QUEUE]

ASSIGN BY: [MOST CAPACITY ▽]

SHIFT HANDLING

1006

SHIFT-BASED ASSIGNMENT: [✓]

AGENT CRITERIA: [LEAST TIME LEFT IN SHIFT ▽]

TIME REMAINING: [✓]

MINIMUM TIME REQUIRED: [30 MINUTES ▽]

TIME SLOT CONTINUITY: [✓]

ASSIGNMENTS OF INCOMING REQUESTS TO SERVERS IN COMPUTING CLUSTERS AND OTHER ENVIRONMENTS

BACKGROUND

Clusters of servers may be arranged to handle incoming requests from one or more queues. The assignment of requests to servers is a complex task and often one for which there is no computably optimal solution. Instead, a number of heuristics may be applied, such as using a first-in-first-out strategy for selecting queued requests and round-robin load balancing. While these techniques provide reasonable results in many situations, modern clustered server systems can be complex and exhibit additional constraints that should be considered.

SUMMARY

Clustered computing systems may employ a number of virtualized servers that are configured to serve incoming requests. Each request may be associated with an expected service duration that is either known or estimated (e.g., 1 minute, 5, minutes, 30 minutes, etc.). As virtualized servers consume computing resources even when idle, it can be advantageous to spin down (e.g., deactivate) at least some virtual servers when the volume of incoming requests is expected to be low, such as during overnight or other off-peak hours.

As a consequence, it can be advantageous to take each virtual server's time remaining in service into account when assigning requests. Particularly, requests should be assigned to virtual servers that have times remaining that are greater than the expected service durations of the requests. Advantageously, the techniques herein can be applied to numerous practical applications, including the assignment of work items to human agents in a customer server environment.

Accordingly, a first example embodiment may involve persistent storage containing definitions of a set of queues and a set of servers, wherein the queues are each configured to store incoming requests, and wherein the servers are respectively associated with deactivation times at which they are to be removed from service. The first example embodiment may also involve one or more processors configured to: (i) identify, by an assignment engine, an incoming request in a particular queue of the set of queues, wherein the incoming request is ready for assignment to one of the servers; (ii) determine, by the assignment engine and based on data associated with the incoming request, an expected duration for servicing of the incoming request; (iii) calculate, by the assignment engine and based on the deactivation times, times remaining in service for each of the servers; (iv) select, by the assignment engine and from the servers, a particular server that has a time remaining that is greater than the expected duration; and (v) assign, by the assignment engine, the incoming request to the particular server.

A second example embodiment may involve identifying, by an assignment engine, an incoming request in a particular queue of a set of queues, wherein the incoming request is ready for assignment, wherein persistent storage contains definitions of the set of queues and a set of servers, wherein the queues are each configured to store incoming requests, and wherein the servers are respectively associated with deactivation times at which they are to be removed from service. The second example embodiment may also involve determining, by the assignment engine and based on data associated with the incoming request, an expected duration for servicing of the incoming request. The second example embodiment may also involve calculating, by the assignment engine and based on the deactivation times, times remaining in service for each of the servers. The second example embodiment may also involve selecting, by the assignment engine and from the servers, a particular server that has a time remaining that is greater than the expected duration. The second example embodiment may also involve assigning, by the assignment engine, the incoming request to the particular server.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 10 depicts a graphical user interface for configuring behavior of an assignment engine, in accordance with example embodiments.

DETAILED DESCRIPTION

Figure 1:
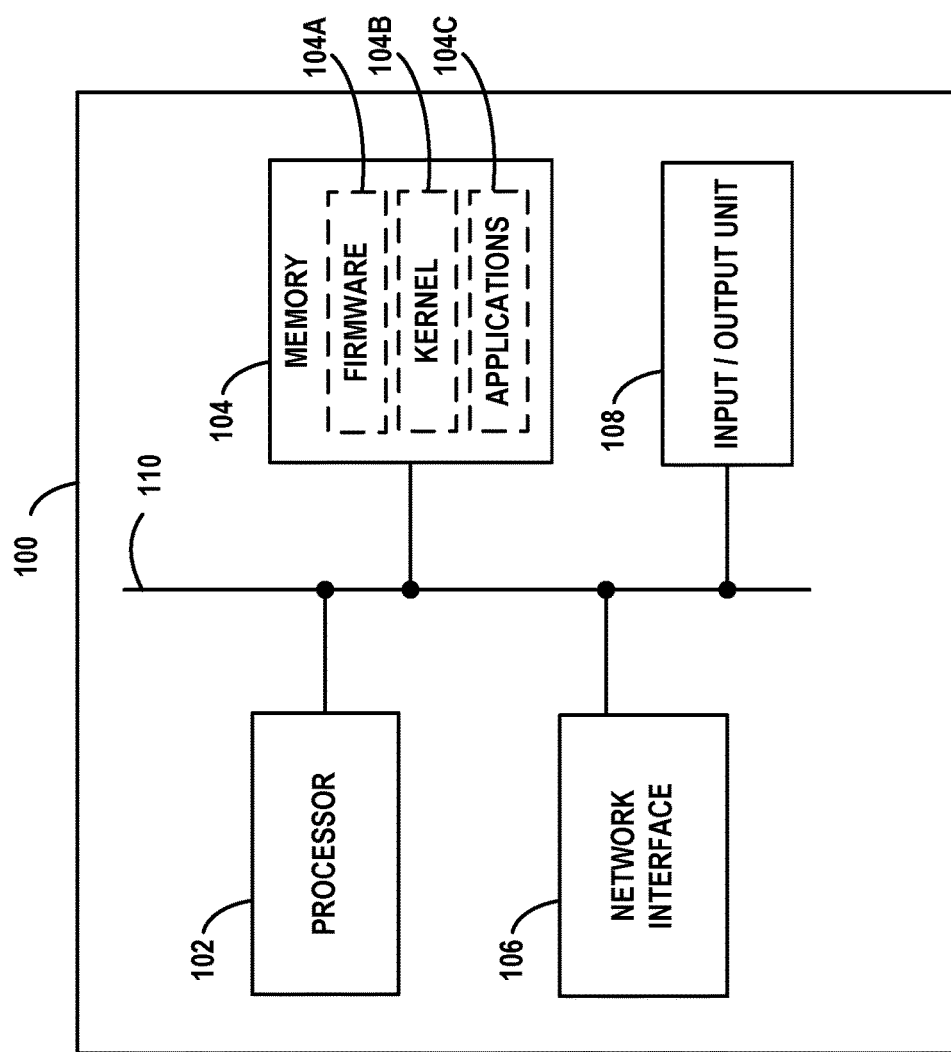
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
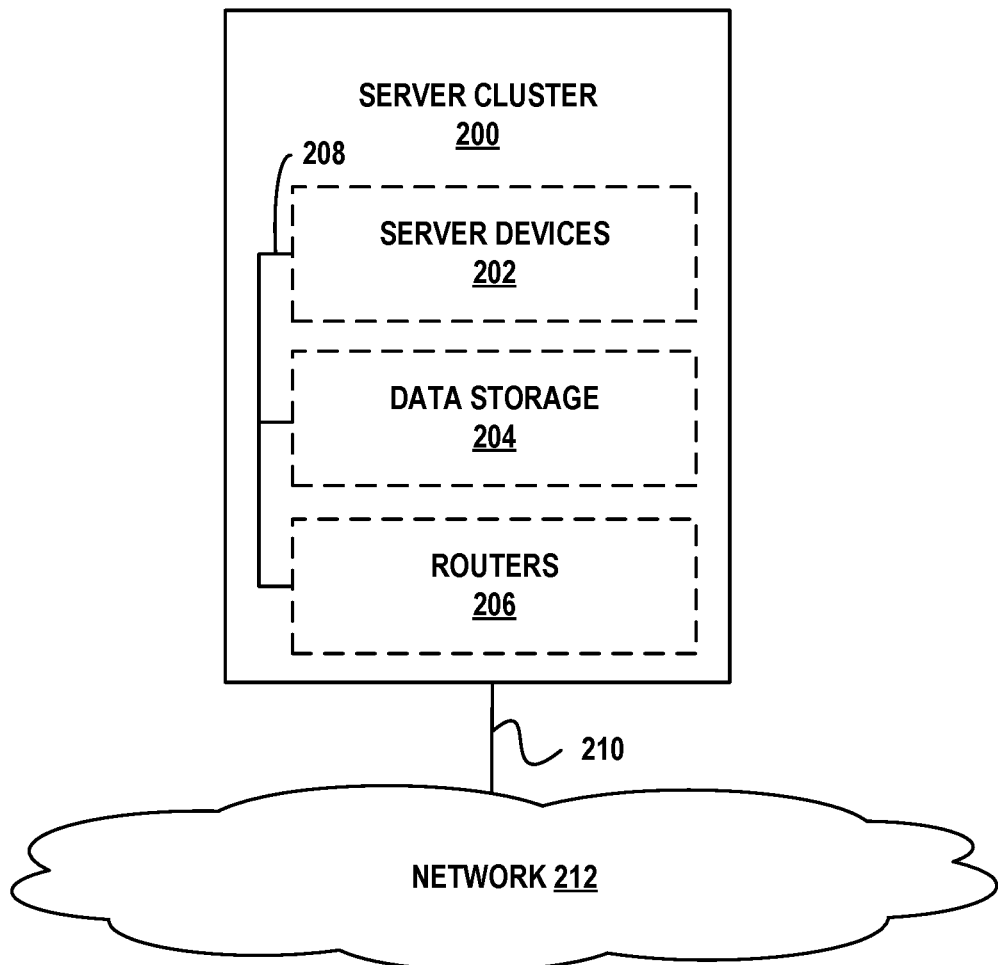
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
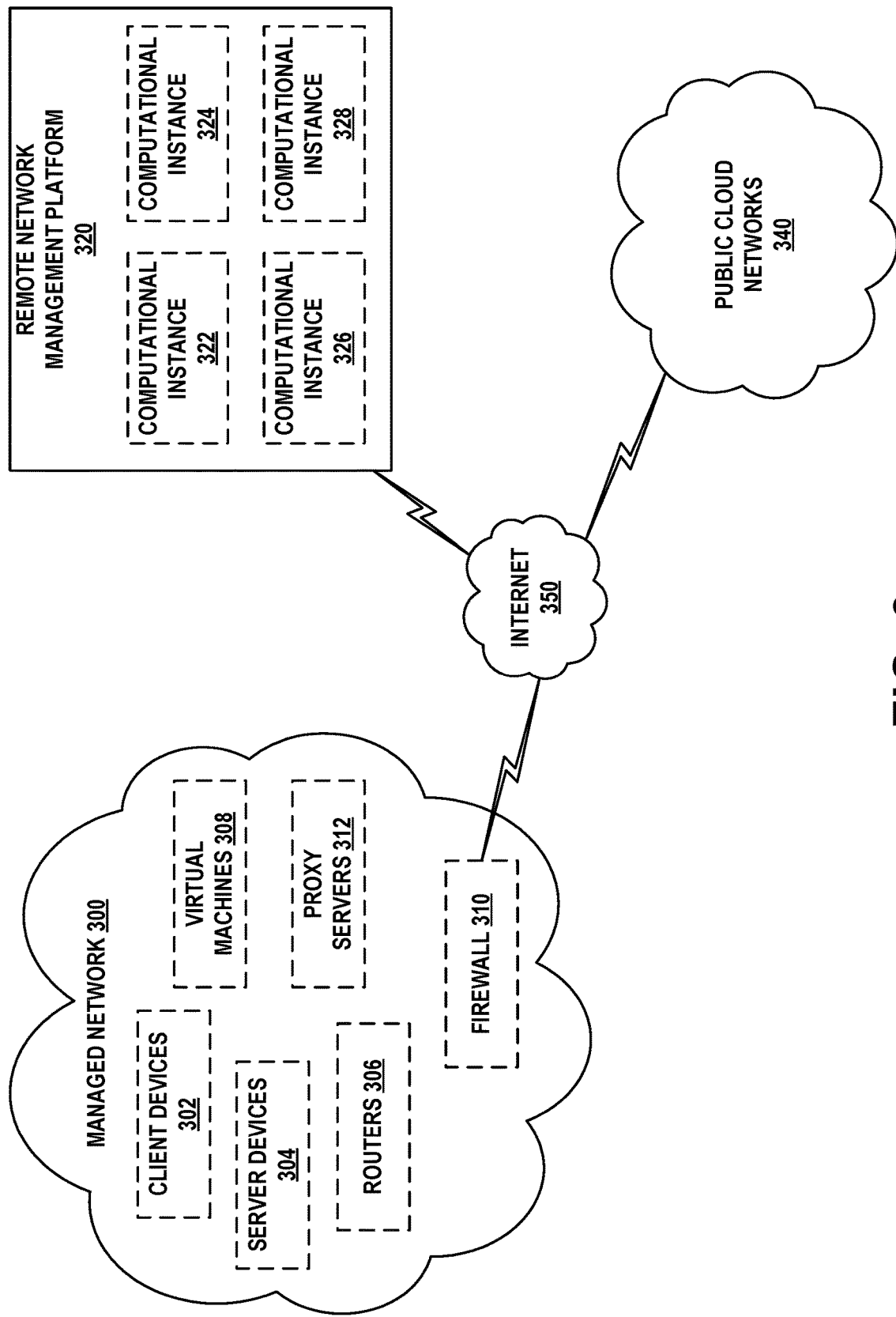
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
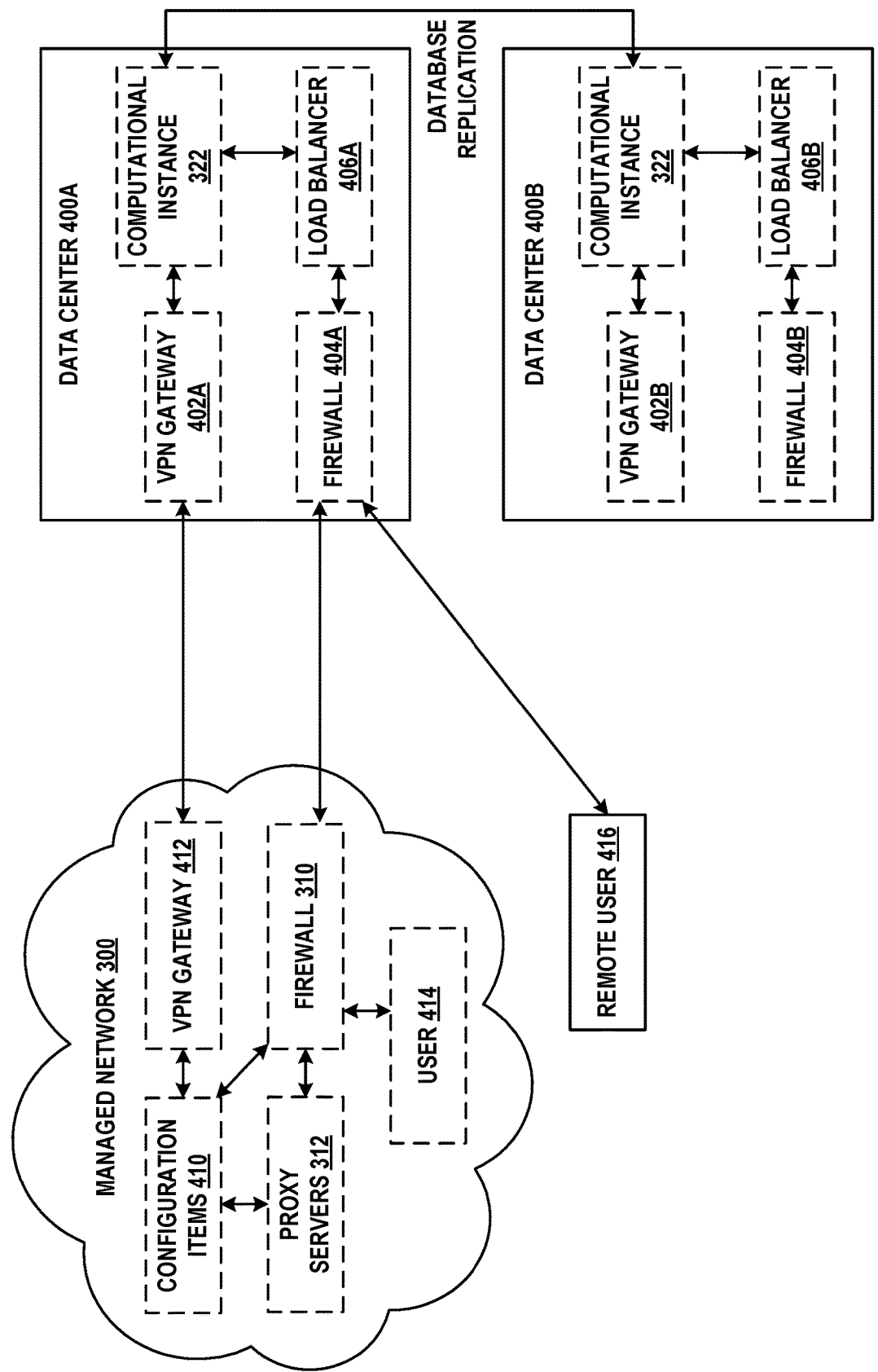
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
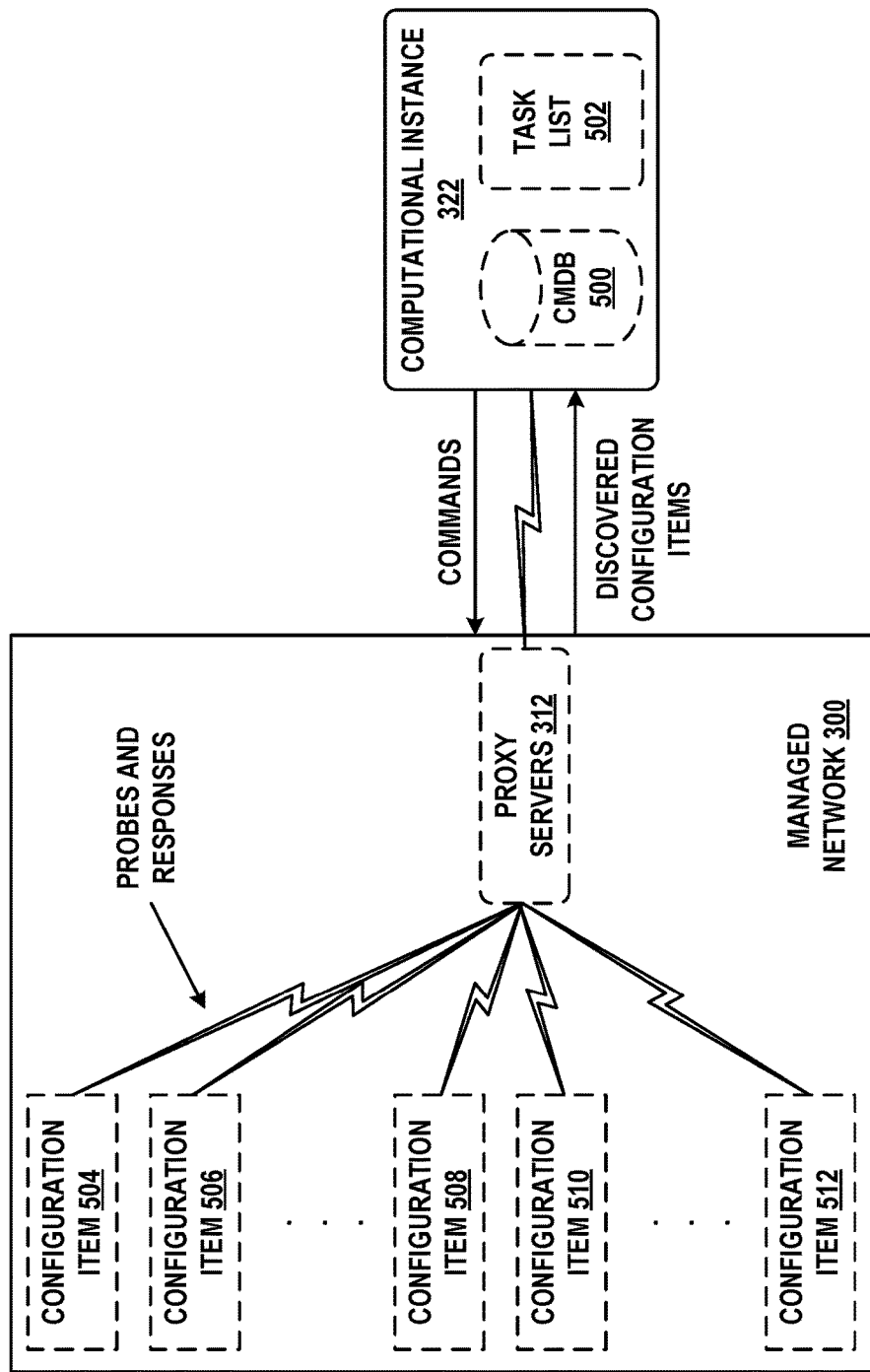
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
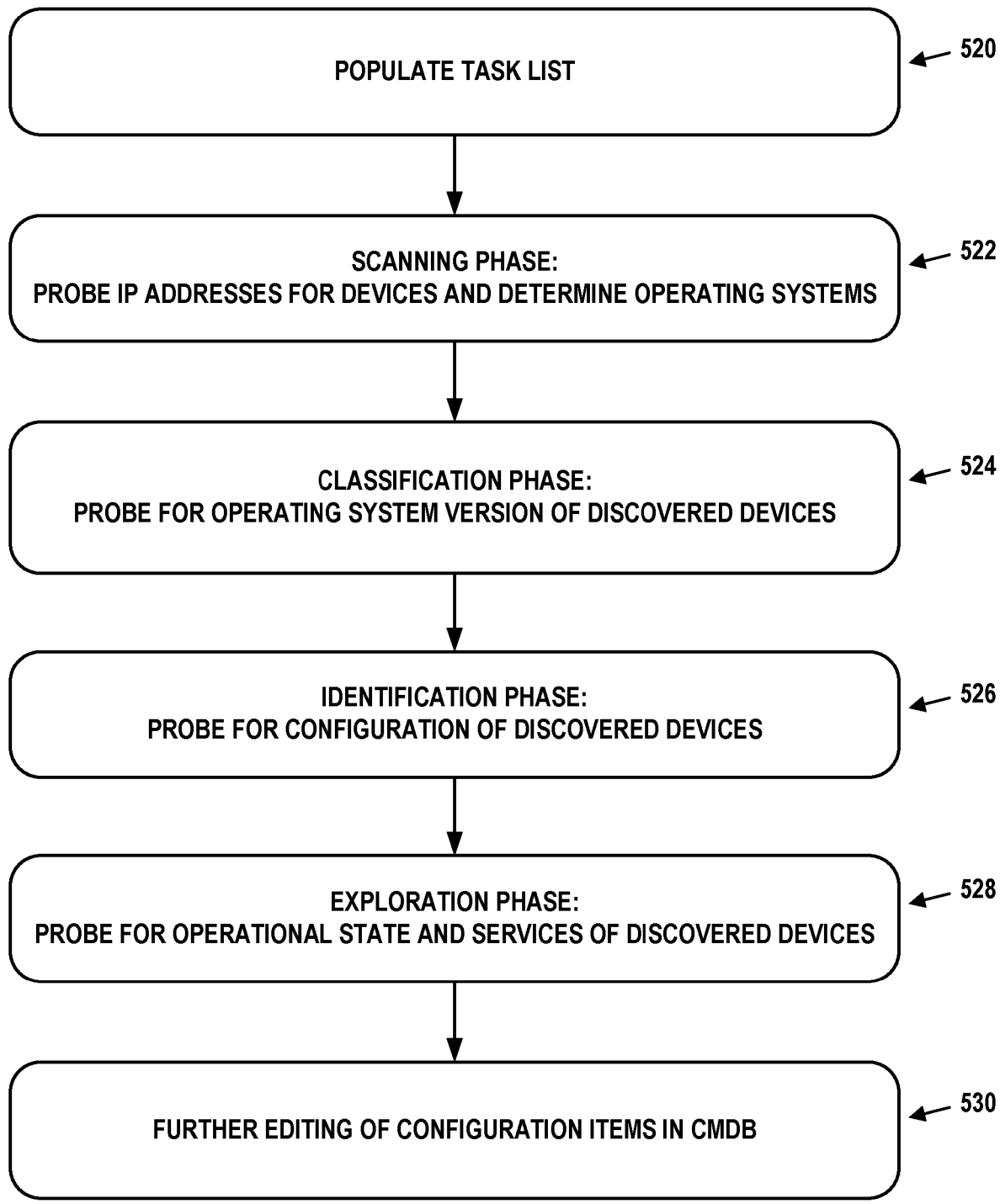
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Request Assignment Techniques

The embodiments herein involve an advanced set of techniques that provide for routing of requests to servers that can attend to these requests. The requests may have a number of characteristics, such as a description of the information requested, a requesting entity, a type, a priority, and/or an expected length of time to serve the request, among others. The servers may be server devices (e.g., standalone or clustered computing devices), virtual servers (e.g., software-based servers that share physical hardware resources with other software-based servers), applications executing on a server devices, or processes or threads that are created, activated, or spun up on demand. Generally speaking, these servers may be located within or associated with a datacenter that has a distinct physical location somewhere in the world.

In certain embodiments, "servers" may refer to agents that address requests. Such an agent may be a human agent or a virtual agent. By convention, requests handled by agents may be referred to as "work items."

A human agent may be an employee of the enterprise that can review and address work items. For example, an IT group within the enterprise may serve as human agents that address requests and issues submitted by employees. As another example, an enterprise may include a customer representative group consisting of agents that addresses submissions from customers.

Virtual agents may also be used to address and resolve work items assigned to queues by the request management system. A virtual agent may be a program based on artificial intelligence (AI) that can provide automated customer service, including the ability to address and resolve various types of work items. In particular, the AI may involve using machine learning and/or natural language processing, among other possible techniques. Each virtual agent may use AI and cognitive computing processes to communicate with the employee or customer submitting the request or issue. For instance, a virtual agent may engage in email, virtual chat, or voice communication. The virtual agent may be able to understand customer intent (e.g., input from the user of a computing device) and can provide personalized answers to questions in a humanlike manner.

In some instances, a virtual agent may address work items in a manner similar to a human agent. For instance, a virtual agent may use conversational technology to understand the intent of a user submitting the work item and responsively provide personalized answers to questions in a humanlike manner. The virtual agent may communicate with users submitting work items via email, live chat, or a messenger application.

In some examples, a virtual agent may initially address a work item and subsequently connect the requesting entity who submitted the work item with a human agent. For example, a virtual agent may obtain information regarding an issue represented by a work item, then provide the work item along with the obtained information to an available human agent. In other examples, a virtual agent may also address and resolve work items without human agent intervention. In particular, the virtual agent might only submit the work item to a human agent when the virtual agent is unable to resolve the request associated with the work item. For example, the virtual agent may determine that the difficulty in resolving a work item exceeds a highest threshold difficulty level that the virtual agent is capable of handling. As a result, a human agent may be reassigned to the work item.

A. Applications Involving Request Assignment

The requests discussed herein may take various different forms. As an example, a request may be for streaming of audio or video (e.g., a podcast, radio station, video clip, movie, or television station) from a server to a client device. The description of the information requested may be a unique identifier of the audio or video (e.g., a numerical or alphanumerical identifier, or a uniform resource locator (URL)). The requesting entity may be a user logged on to a streaming client application that is executing on the client device. The type may indicate that the request is for streaming audio or streaming video, and may specify whether the stream is prerecorded (e.g., with the entire content thereof on the server) or live (with the server receiving the content and maintaining of buffer of it for playout). In some cases, the type may also specify the type of content requested (e.g., topic, genre, or category) and/or the modality of the request (e.g., screen size of the client device for playback). The priority may indicate how important the request should be considered on an absolute or relative scale (e.g., requests from requesting entities who purchase a premium service may be given priority over those from entities who do not). The expected length of time to serve the request may be known based on the requested content (e.g., a 15-minute video clip, or a 40-minute podcast) or unknown (e.g., when a live broadcast stream is requested). In the latter case, the expected length of time may be estimated based on historical data relating to the requesting entity, historical data across a number of requesting entities, historical data relating to the specific content requested, or historical data relating across a number of units of requested content of the same type. Alternatively, the expected length of time may be fixed per the requested content.

In another embodiment, a request may be for an interactive audio or video call involving the requesting entity and one or more other entities. In this case, the request may be for resources to support the call on a signaling server and/or media server. The description of the information requested may be a unique identifier of the call (e.g., a numerical or alphanumerical identifier, or a URL). The requesting entity may be a user logged on to an audio or video conferencing client application that is executing on the client device. The type may indicate that the request is for an audio or video call, and may specify the number of expected participants and any particular codecs to be used. The priority may indicate how important the request should be considered on an absolute or relative scale (e.g., requests involving certain users, such as such as premium or VIP users, as well as public safety, law enforcement, or fire protection, may be given priority over other types of users). The expected length of time to serve the request may be specified in the request or unknown. In the latter case, the expected length of time may be estimated based on historical data relating to the requesting entity or historical data across a number of requesting entities. Alternatively, the expected length of time may be fixed.

In yet another embodiment, a request may be a work item generated by an enterprise user. The work item may be for an online chat (e.g., messaging) session with an agent, an audio or video call with an agent, or a callback from an agent. The enterprise user may be, for example, a technology user with one or more specific IT issues (e.g., their email is not working, their laptop is broken, or they are unable to log on to a VPN). The type of request may be (as noted above) a messaging session, an audio call, video call, or some other modality. The priority may be based on the requesting user (e.g., a premium or VIP user may have priority over other users) and/or the criticality of the work item (e.g., a problem preventing the requesting user from carrying out mission-critical tasks may have a higher priority than less urgent problems). The expected length of time may be based on the priority of the work item (e.g., high-priority work items are allocated more time than low-priority work items).

As any example, IT-related work items being assigned to human servers may be one of four priorities. In decreasing order, these could be: P1 (critical), P2 (high), P3 (medium), and P4 (low). A nominal expected amount of time to resolve each may be configured, such as 3 hours for a P1, 1 hour for a P2, 30 minutes for a P3, and 15 minutes for a P4.

An alternative to static configuration of these expected amounts of time could involve training a machine-learning model with historical work items that have been completed. Each such historical work item may have a priority (e.g., P1, P2, P3, or P4) as well as other data, and may be labeled with the actual amount of time that was spent to serve the work item to resolution. Once trained, the model (e.g., a neural network and/or regression based technique), may be given a new request and may predict the time required to serve this request.

Other possibilities exist. This general framework could also be applied to assigning web servers to serve web requests, assigning gaming servers to serve gaming clients, and so on.

B. Routing and Assignment Architectures

Figure 6A:
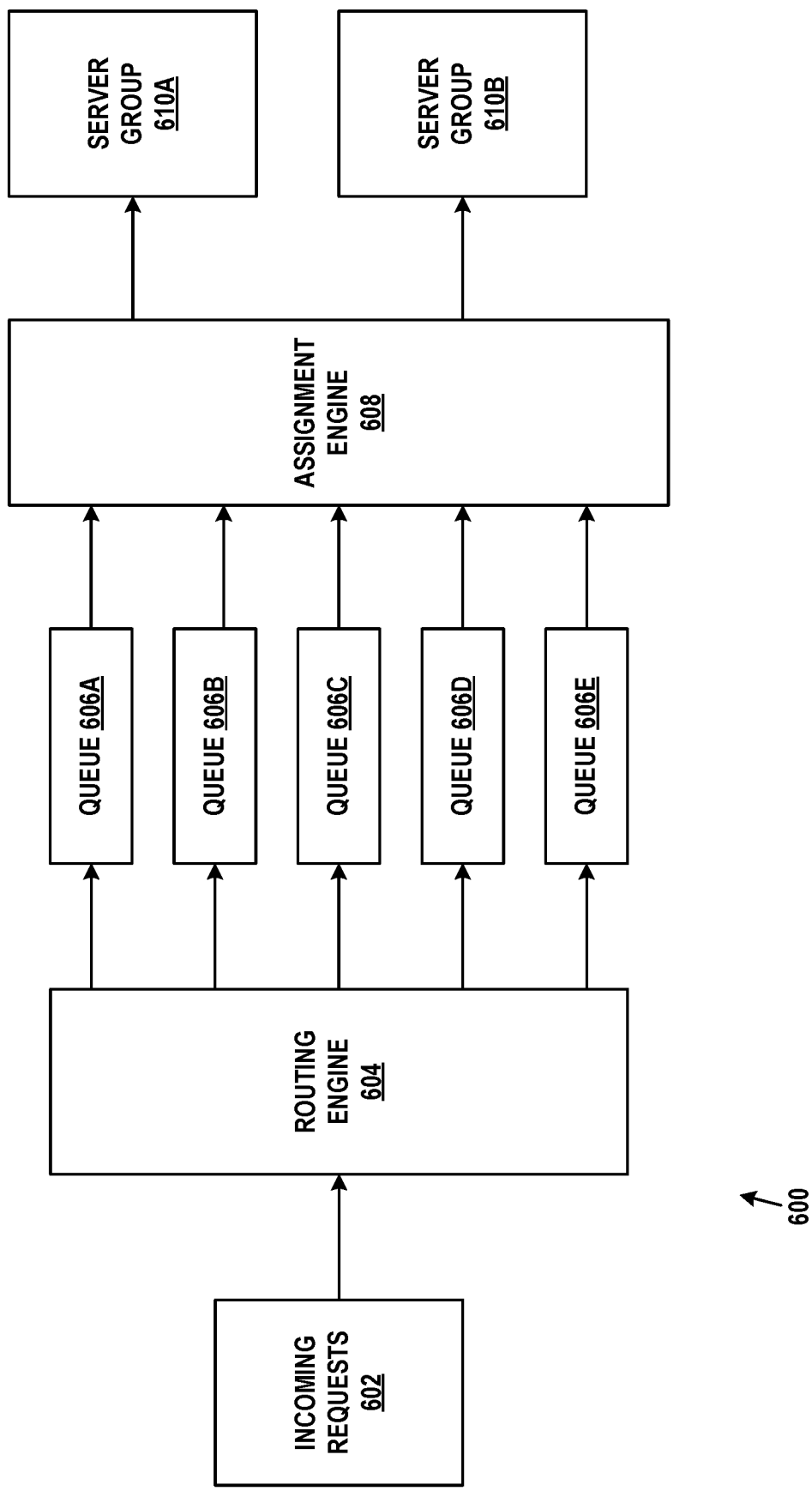
FIG. 6A depicts an architecture for assigning incoming requests to servers, in accordance with example embodiments.

FIG. 6A provides an illustration of example routing and assignment architecture 600. This architecture may apply to the assignment of servers to support streaming services, voice calls, video calls, and so on.

Incoming requests 602 are provided to routing engine 604. Routing engine 604, in turn, determines in which of queues 606A, 606B, 606C, 606D, or 606E to place each request. These queues may operate according to a first-in-first-out (FIFO) discipline, for example. In some cases, different types or priorities of requests may be routed to different queues. For example, audio streaming requests may be routed to queue 606A, video streaming requests may be routed to queue 606B, audio call requests may be routed to queue 606C, video call requests may be routed to queue 606D, and so on.

Assignment engine 608 removes requests from queues 606A, 606B, 606C, 606D, and 606E, and then assigns these requests to servers of either server group 610A or server group 610B. Assignment engine 608 may remove requests from these queues in a round-robin fashion, or with preference given to one or more of the queues. For example, assignment engine 608 may remove all requests in queue 606A before considering requests in queue 606B, remove all requests from queue 606B before considering requests in queue 606C, and so on.

Server groups 610A and 610B may be distinct sets of servers in the same or different locations. For example, server groups 610A and 610B could include, respectively, two different sets of virtual servers in the same datacenter, or two different sets of physical or virtual servers in two different datacenters. In some embodiments, servers within one of server groups 610A and 610B may configured to serve certain types of requests, and servers within the other of server groups 610A and 610B may be configured to serve other types of requests. In other embodiments, any server may be configured to serve any type of request.

For a given request removed from a queue, assignment engine 608 may be configured to select a server group and then a server within the selected server group. These selections may be based on various parameters associated with the request, such as the requesting entity, the information requested, the type of request, and/or the priority of the request. As will be described in more detail below, other factors may be taken into account.

Figure 6B:
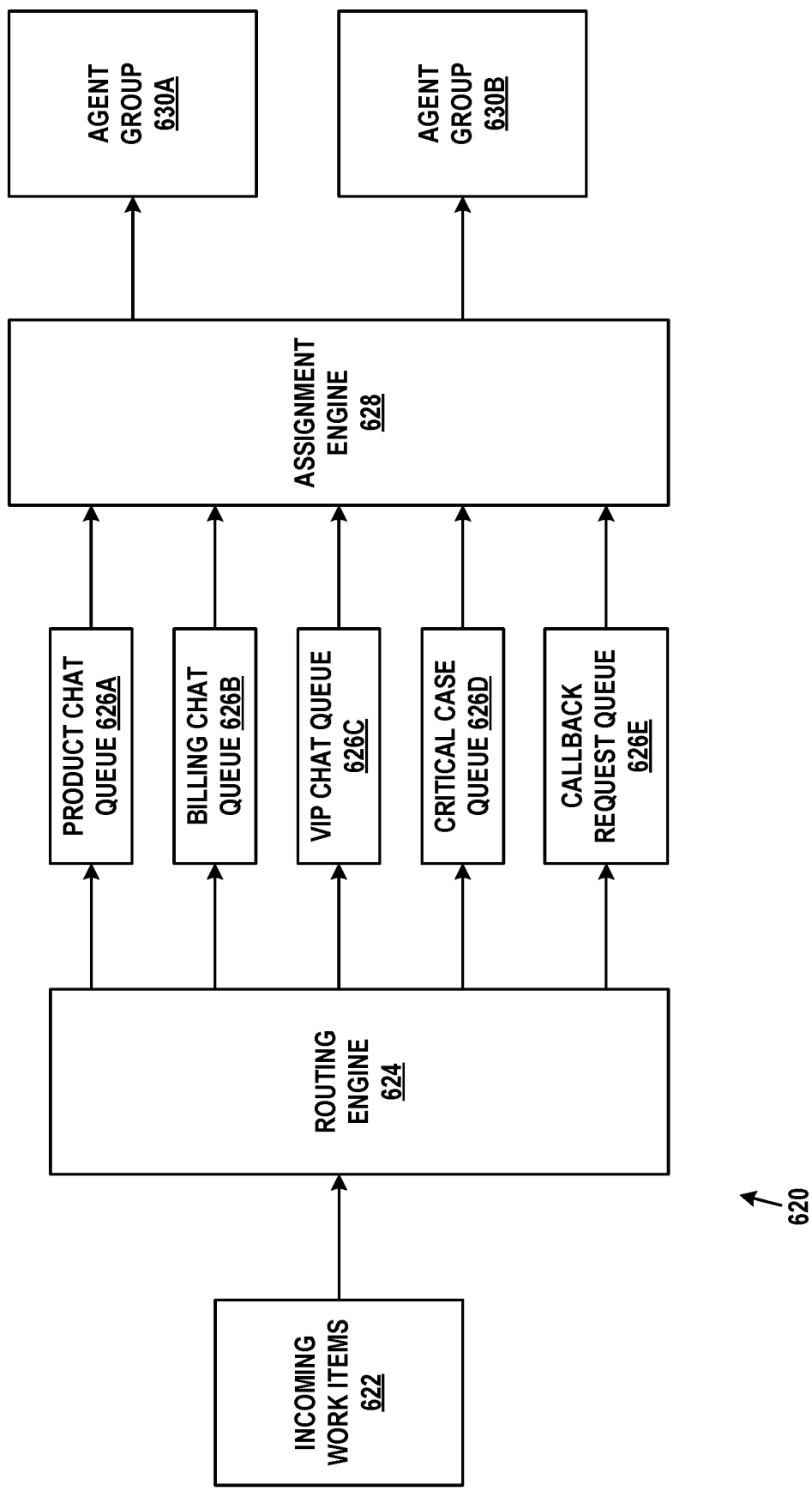
FIG. 6B depicts an architecture for assigning work items to agents, in accordance with example embodiments.

FIG. 6B provides an illustration of example routing and assignment architecture 620. This architecture may apply to the assignment of work items to virtual or human agents.

Incoming work items 622 are provided to routing engine 624. Routing engine 624, in turn, determines in which of queues 626A, 626B, 626C, 626D, or 626E to place each work item. These queues may also operate according to a FIFO discipline, for example. In some cases, different types or priorities of work items may be routed to different queues. For example, product chat work items may be routed to queue 626A, billing chat work items may be routed to queue 626B, VIP chat work items may be routed to queue 626C, critical case work items may be routed to queue 626D, call back request work items may be routed to queue 626E, and so on.

Assignment engine 628 removes work items from queues 626A, 626B, 626C, 626D, and 626E, and then assigns these work items to agents of either agent group 630A or agent group 630B. Assignment engine 628 may remove requests from these queues in a round-robin fashion, or with preference given to one or more of the queues. For example, assignment engine 628 may remove all requests in 626C (VIP chat work items) before considering requests in other queues.

Agent groups 630A and 630B may be distinct sets of virtual or human agents in the same or different locations. For example, agent group 630A and 630B could include two different sets of agents in the same location, or two different sets of agents in two different locations. In some embodiments, agents within one of agent groups 630A and 630B may serve certain types of work items, and agents within the other of agent groups 630A and 630B may serve other types of work items. For example, some virtual or human agents may have specific capabilities, knowledge, experience, and or training that may suit them to handle certain types of work items better than others. In other embodiments, any agent may serve any type of work item.

For a given work item removed from a queue, assignment engine 628 may be configured to select an agent group and then an agent within the selected agent group. These selections may be based on various parameters associated with the work item, such as the requesting entity, the information requested, the type of request, and/or the priority of the request.

Other factors may be taken into account when assigning requests to servers or work items to agents. For sake of simplicity, these factors will be discussed below in the context of requests to servers with the understanding that the same or similar factors may be used when assigning work items to agents.

The location, availability, capacity, and capabilities of a server may determine, in part, whether the server is selected to serve a request. Location may refer to a physical location or topological network location of a server. Servers with physical locations closer to the requesting entity may be selected over servers that are further away from the requesting entity in other to reduce network traffic and latency. Availability may be a binary value indicating whether the server is available to serve requests. Servers may, from time to time, be taken out of service or go offline either according to a schedule or for planned maintenance. Capacity refers to the volume of requests that a server can handle per unit of time. Some servers may be faster or more efficient than others, and therefore be capable of processing more requests in a serial or parallel fashion. In some cases, requests may be taken from a queue and placed in a further queue that is dedicated to a particular server, and the capacity of the server may be based on (e.g., inversely proportional to) the occupancy of the queue. Capabilities of a server may refer to the types of requests that a server is configured to be able to serve.

Additional factors may be used as well. In some cases, if the servers of a selected server group are too busy to handle an incoming request, one or one or more designated overflow server groups may be selected. These overflow groups may be in less desirable locations (e.g., further away from the requesting entity), or have less specialized capabilities to handle the request.

Another factor that may be taken into consideration is affinity between the server and requesting entity. Affinity refers to the server's relationship or history with the requesting entity and therefore may be more applicable when the server is a human agent handling a work item. For example, if a requesting entity has previously been served by the server, then there may be a greater affinity between the requesting entity and the server than if the requesting entity has not been previously served by the server. Affinity is particularly relevant when servers are human agents, as requesting entities may feel comfortable working with a human agent that they have worked with before, and the human agent may have institutional knowledge regarding the specific issues or concerns of these requesting entities. Affinity may also be used to assign a server to a request if the server has experience with similar requests and/or similar requesting entities. Again, these factors may be particularly relevant when the server is a human agent.

C. Request Assignment Across Regions

Figure 7:
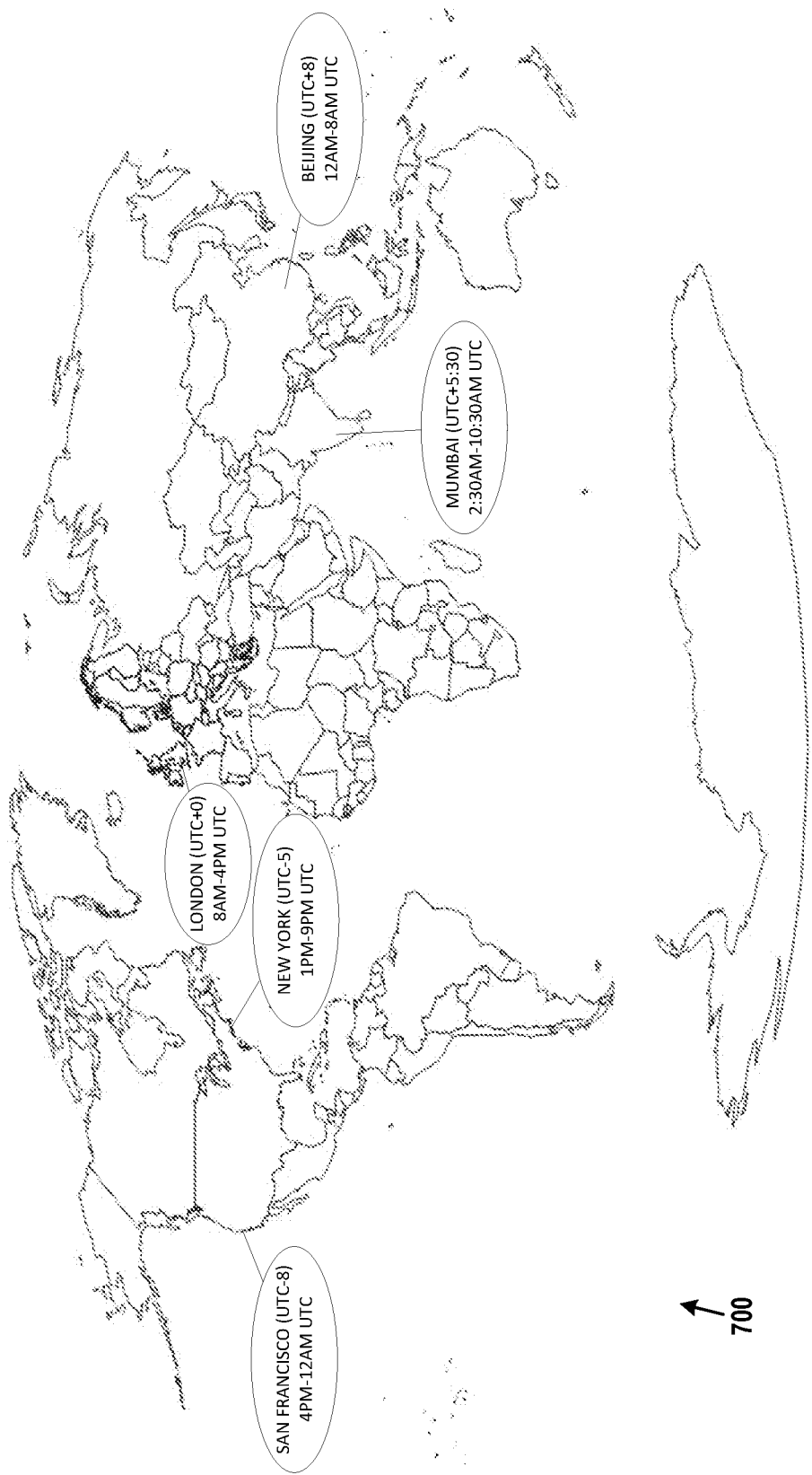
FIG. 7 depicts a number of datacenters in different time zones of the world, in accordance with example embodiments.

As a practical example of how some of these factors may be taken into account, map 700 of FIG. 7 depicts five datacenters in different parts of the world. Particularly, these datacenters are in San Francisco, N.Y., London, Mumbai, and Beijing. Each datacenter may include a number of servers to which requests can be assigned.

London is at coordinated universal time (UTC) plus 0 hours (UTC+0). This means that London's local time is the same as UTC time (e.g., 8 am in London is 8 am UTC time).

San Francisco is UTC minus 8 hours (UTC−8). This means that local time in San Francisco is 8 hours earlier than local time at UTC+0 (e.g., 8 am in San Francisco is 4 pm in London).

New York is UTC minus 5 hours (UTC−5). This means that local time in New York is 5 hours earlier than local time at UTC+0 (e.g., 8 am in New York is 1 pm in London).

Mumbai is UTC plus 5:30 hours (UTC+5:30). This means that local time in Mumbai is 5 and a half hours later than local time at UTC+0 (e.g., 8 am in Mumbai is 2:30 am in London).

Beijing is UTC plus 8 hours (UTC+8). This means that local time in Beijing is 8 hours later than local time at UTC+0 (e.g., 8 am in Beijing is 12 am in London).

Based on the time zones in which these datacenters are located, each may serve requests at different times of day. For example, servers in each datacenter may be arranged to be able to serve more requests during peak hours, which are assumed herein to be 8 am to 4 pm local time for sake of simplicity. The UTC times of these peak hour periods are provided in FIG. 7. Outside of peak hour periods, the servers may operate at a reduced capacity.

For example, there may be a cost, in terms of memory, processor utilization and/or power, to maintaining a virtual server. Thus, as request volume is expected to decrease (e.g., around 4 pm local time), at least some virtual servers in a datacenter may be spun down (deactivated). Likewise, as request volume is expected to increase (e.g., around 8 am local time), at least some virtual servers may be spun up (activated). As a concrete example, the San Francisco datacenter may operate with 20 virtual servers between 8 am and 4 pm local time, and only 10 virtual servers between 4 pm and 8 am local time.

The schedules that determine the number of virtual servers per datacenter at any given point in time, may be configured into a hypervisor. Alternatively, the virtual servers may be containerized and controlled by way of an orchestration platform, such as Kubernetes. In some embodiments, all virtual servers may be scheduled to be spun down at some point in the future, either to conserve resources or as part of a periodic server refresh policy.

An analogous situation exists for human agents who address work items. Each human agent may have shifts with on-duty and off-duty hours. For sake of argument, assume that some human agents are on-duty from 8 am to 4 pm local time and off-duty from 4 pm to 8 am local time. Other human agents may have a 4 pm to 12 am on-duty shift or a 12 am to 8 am on-duty shift. More human agents may be available during the 8 am to 4 pm shift than during the other shifts.

In full generality, datacenters may have different peak hour periods that start and end at different times, and/or are shorter or longer. In some cases, there may be different extents of servers available during various off-peak periods. For example, the San Francisco datacenter may operate with 20 virtual servers between 8am and 4 pm local time, 15 virtual servers between 4 pm and 12 am local time, and 10 virtual servers between 12 am and 8am local time. Other possibilities exist.

D. Server Selection Based on Remaining Time in Service

Each server, virtual and human, may be subject to a time remaining in service. Once this time is reached, a virtual server is spun down or otherwise decommissioned and a human server ends his or her shift.

Generally, it is preferable for requests to be routed to the nearest server (e.g., requests from Europe may be preferentially routed to the London datacenter). But as a consequence of peak hours occurring during different periods of time in different locations, some datacenters can server as overflow capacity for other datacenters. For example, 1 pm to 4 pm UTC, both the London and New York datacenters are at full capacity for handling requests. Thus, incoming requests from Europe or North America could be assigned to either datacenter.

To that point, the overlap in peak hours and the time remaining for each server can be leveraged to improve assignments of incoming requests to servers. In particular, it is undesirable to assign an incoming request to a server with a time remaining t if service of that request is expected to take longer than t. As noted above, the length of time needed to serve a request may be known, but if it is not known may be estimated. Thus, based on the known or estimated length of time associated with a request, a server should be assigned with a remaining time that is at least this length.

Doing so can improve server quality. Some types of requests may be difficult to hand over from one server that is about to be spun down or go off shift to another that will remain in service for some period. For example, a video call that is moved from one virtual media server to another may suffer from a disruption of service due to the handover. Likewise, a human server that is addressing an IT issue with a customer may not be able to smoothly transfer the state of their investigation of the issue over to a different human server.

Doing so may also reduce resource utilization and cost. While a virtual server can be reconfigured to remain in service beyond its ostensible spin-down time, this server would continue to use computational resources (e.g., processing, memory, and network capacity). Likewise, a human server may be able to continue to work beyond the end of his or her shift, but would also continue to use resources. Further, there may be an additional cost to maintaining virtual and human servers outside of their scheduled times of availability—virtual server pricing may transition from a flat rate to an on-demand model, while human servers may need to be paid overtime.

Thus, for each incoming request, its expected duration is determined. This duration may be compared to the time remaining for each server that has been identified as otherwise able to serve the request. A server with a time remaining that is greater than the expected duration is selected to serve the request. This may involve selecting the server with the highest time remaining that is greater than the expected duration, selecting the server with the lowest time remaining that is greater than the expected duration, or selecting a server based on other factors.

Figure 8:
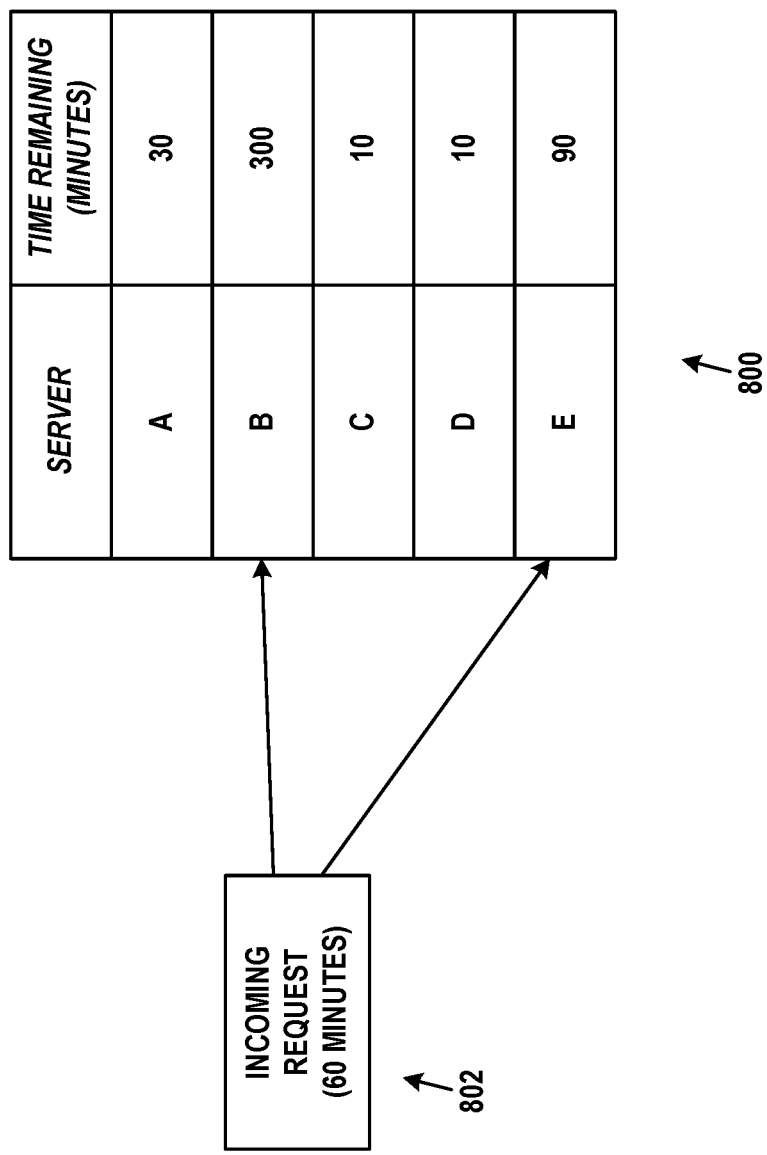
FIG. 8 depicts assignment of incoming requests based on times remaining in service of servers, in accordance with example embodiments.

FIG. 8 provides an illustration of server selection. Table 800 contains entries for five servers, A, B, C, D, and E. Each is associated with a time remaining representing the number of minutes that the server will be in service. In some cases, instead of a time remaining, table 800 may include a time at which each server will be taken out of service and the time remaining can be calculated from this information. The times at which servers are to be taken out of service may be configurable and stored in an operational profile for each server. Also, while table 800 represents time remaining in minutes, other units of time (e.g., seconds) may be used.

Incoming request 802 is known or estimated to require 60 minutes. Thus, as shown in FIG. 8, only two servers, B, and E, have times remaining that are sufficiently long to service this request. Servers A, C, and D all have times remaining that are less than 60 minutes. Consequently, either server B or server E should be selected.

In some cases, especially for requests handled by human servers, it can be beneficial to consider optionally breaking the service of the request across multiple time slots. For example, a request estimated to be two hours might be effectively broken up into two one-hour requests that are assigned sequentially. Alternatively, the assignment engine can be configured to only assign continuous time slots so that requests are expected to be handled in a single time slot.

E. Overall Server Selection Procedures

Figure 9A:
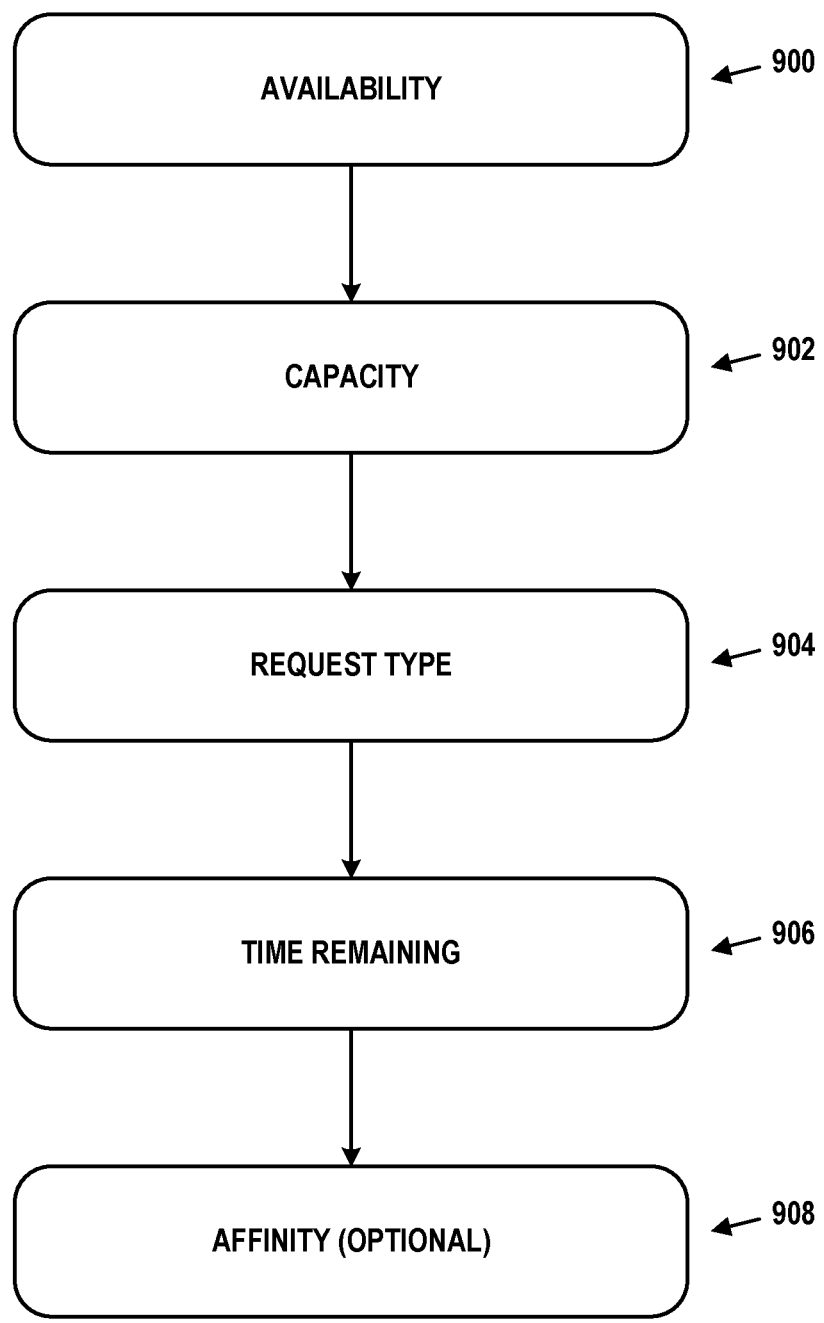
FIG. 9A depicts an ordering of factors to consider when assigning requests to servers, in accordance with example embodiments.

Putting this in a larger perspective, FIG. 9A depicts a series of decisions that an assignment engine may make in order to select a server from an initial set of candidate servers. Each decision may narrow the set of candidate servers accordingly. In various embodiments, these decisions may be made in different orders.

At step 900, the availability of each server may be determined. Availability may represent whether the server is active and able to receive new requests. Servers that are not available may be removed from the candidate set.

At step 902, the capacity of each server may be determined. Capacity may represent how many requests are currently being processed by the server and/or are queued for processing by the server. Servers with less than a threshold amount of capacity may be removed from the candidate set.

At step 904, the type of the request may be compared to the capabilities of each server. Any servers that cannot handle the type of the request may be removed from the candidate set.

At step 906, the time remaining in service for each server may be compared to the time required to serve the request.

Any server with a time remaining that is less than the time required to serve the request may be removed from the candidate set.

At optional step 908, the affinity between the each server and the requesting entity may be determined. Any server below a threshold affinity with the requesting entity may be removed from the candidate set. Alternatively, the n servers with the highest affinity with the requesting entity may be kept in the candidate set, while all other servers are removed.

Once the candidate set has been narrowed in according with steps 900-908, a server may be selected from those that remain. This selection may be made randomly, based on load at that server (e.g., the server with most capacity), or other factors. For instance, the server that has not received a new assignment in the longest period of time may be selected.

Figure 9B:
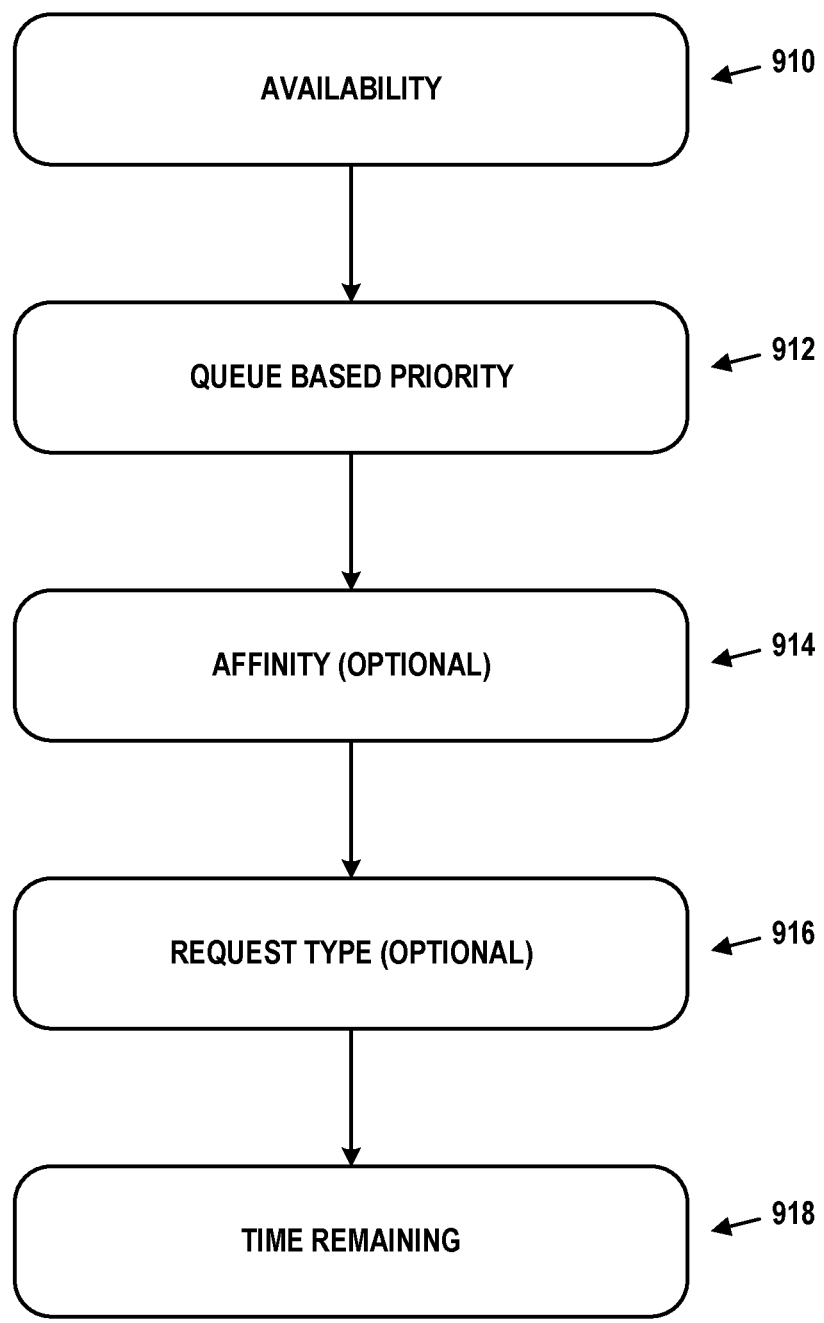
FIG. 9B depicts another ordering of factors to consider when assigning requests to servers, in accordance with example embodiments.

FIG. 9B depicts an alternative series of decisions that an assignment engine may make in order to select a server from an initial set of candidate servers. As was the case for the decision process of FIG. 9A, these decisions may be made in different orders.

At step 910, the availability of each server may be determined. Servers that are not available may be removed from the candidate set.

At step 912, the queue-based priority of each server is considered. A server group may be associated with a ranked listing of queues such that assignments of incoming requests from queue higher in the listing are provided to that server group with priority. For example, in the context of FIG. 6A, server group 610A may be configured to receive assignments from queue 606A preferentially over assignments from queue 606B. Servers with a sufficiently low priority for the queue in which the request resides may be removed from the candidate set.

At optional step 914, the affinity between the each server and the requesting entity may be determined. Any server below a threshold affinity with the requesting entity may be removed from the candidate set. Alternatively, the n servers with the highest affinity with the requesting entity may be kept in the candidate set, while all other servers are removed.

At optional step 916, the type of the request may be compared to the capabilities of each server. Any servers that cannot handle the type of the request may be removed from the candidate set.

At step 918, the time remaining in service for each server may be compared to the time required to serve the request. Any server with a time remaining that is less than the time required to serve the request may be removed from the candidate set.

Once the candidate set has been narrowed in according with steps 910-918, a server may be selected from those that remain. This selection may be made randomly, based on load at that server (e.g., the server with most capacity), or other factors. For instance, the server that has not received a new assignment in the longest period of time may be selected.

The procedures illustrated by FIGS. 9A and 9B may be carried out for one datacenter at a time until a server is assigned to the incoming request. Thus, a first candidate set may initially include servers associated with a first datacenter. If the first candidate set after narrowing is non-empty, a server may be selected from the first candidate set. If the first candidate set after narrowing is empty, a second candidate set may initially include servers associated with a second datacenter. If the second candidate set after narrowing is non-empty, a server may be selected from the second candidate set. If the second candidate set after narrowing is empty, a third candidate set of servers associated with a third datacenter may be considered. This process may continue across further datacenters, if necessary, until a server is assigned or it is determined that no server can be assigned.

Alternatively, the procedures may be carried out by pooling all servers within two or more datacenters into a combined candidate set. A server may be selected from this candidate set or it may be determined that no server can be assigned.

F. Example Graphical User Interfaces

FIG. 10 depicts example graphical user interface 1000 for configuring at least some aspects of server assignment based on time remaining in service. For purposes of illustration, graphical user interface 1000 focuses on shift-based assignment for human agents.

Particularly, graphical user interface 1000 includes three panes 1002, 1004, and 1006. Pane 1002 indicates that graphical user interface allows configuration of assignment rules, particularly assignment rules for use with work items selected from the VIP chat queue. Pane 1002 also has buttons that are actuatable to update any changes made to these rules in panes 1004 or 1006, as well as to delete the rule.

Pane 1004 allows specification of a name and short description of the rule in respective text boxes. Pane 1004 also allows specification of initial criteria by which an agent is to select in a drop-down menu. In FIG. 10, assignment to the agent with the most capacity is selected.

Pane 1006 involves configuration of optional shift-based assignment features. In pane 1006, shift-based assignment can be toggled on (activated) or off (deactivated) by a check-box. When shift-based assignment is on, agent criteria can be selected from a drop-down menu. Options in this menu may include least time left in shift or most time left in shift, for example. In FIG. 10, least time left in shift is selected. Pane 1006 also allows agent time remaining to be toggled on or off by a check-box. When agent time remaining is on, any of the embodiments described above with respect to assigning work items to agents based on time remaining in the agents' shifts may be employed. Further, a minimum required time remaining may be specified, which is shown as 30 minutes in FIG. 10. This value may be selected by way of a drop-down menu, for example. Moreover, time slot continuity may be required when the associated check-box is selected.

VI. Example Operations

Figure 11:
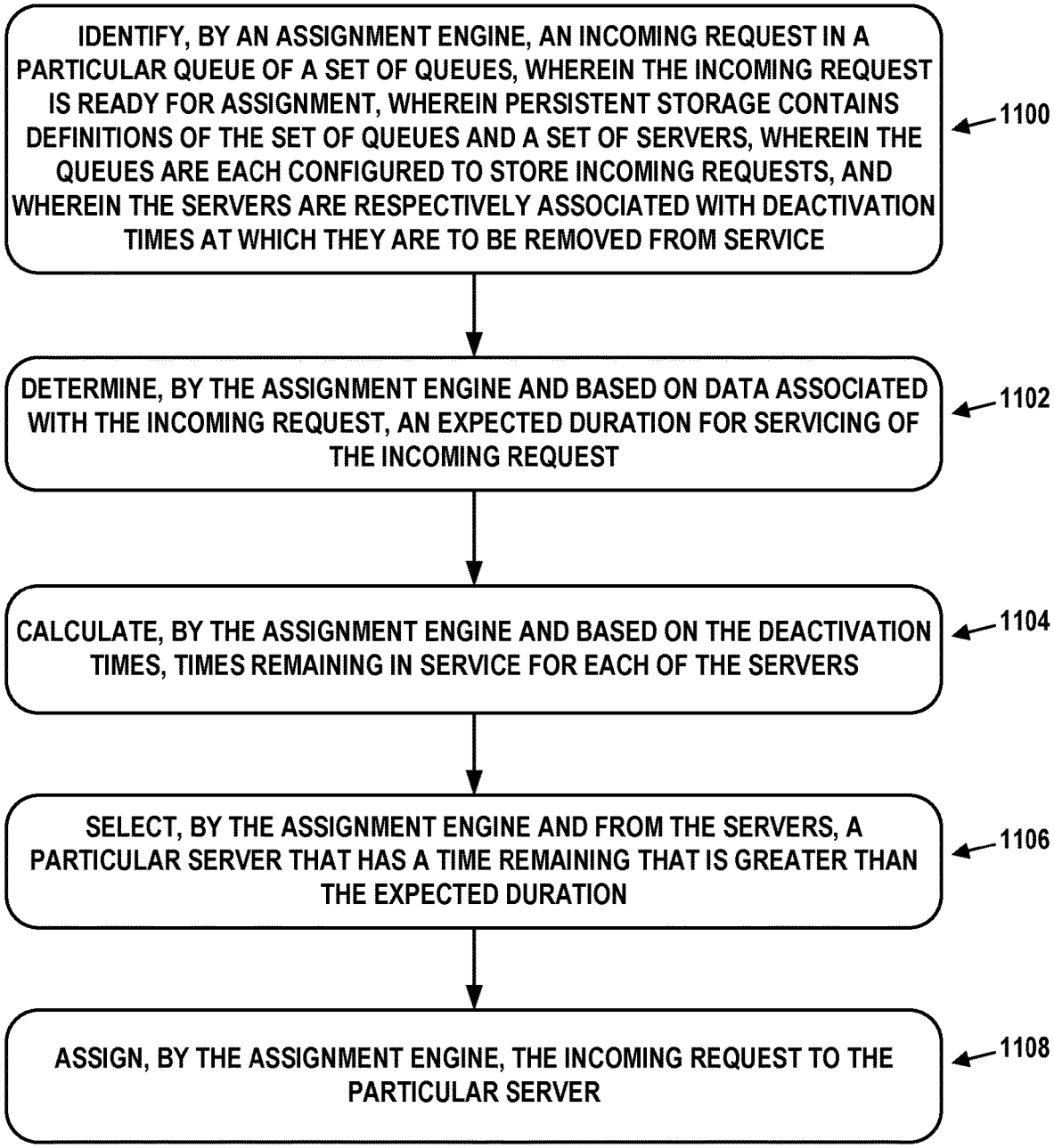
FIG. 11 is a flow chart, in accordance with example embodiments.

FIG. 11 is a flow chart illustrating an example embodiment. The process illustrated by FIG. 11 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 11 may be simplified by the removal of any one or more of the features shown therein. Further, these embodiments may be combined with features, aspects, and/or implementations of any of the previous figures or otherwise described herein.

Block 1100 may involve identifying, by an assignment engine, an incoming request in a particular queue of a set of queues, wherein the incoming request is ready for assignment, wherein persistent storage contains definitions of the set of queues and a set of servers, wherein the queues are each configured to store incoming requests, and wherein the servers are respectively associated with deactivation times at which they are to be removed from service.

Block 1102 may involve determining, by the assignment engine and based on data associated with the incoming request, an expected duration for servicing of the incoming request.

Block 1104 may involve calculating, by the assignment engine and based on the deactivation times, times remaining in service for each of the servers.

Block 1106 may involve selecting, by the assignment engine and from the servers, a particular server that has a time remaining that is greater than the expected duration.

Block 1108 may involve assigning, by the assignment engine, the incoming request to the particular server.

In some embodiments, the expected duration is based on a priority of the incoming request or an importance associated with the particular queue.

In some embodiments, the expected duration is based on output from a machine-learning model, wherein the machine-learning model was trained with past requests that were respectively labelled with actual servicing durations, and wherein the machine-learning model predicts the expected duration based on the past requests as labelled. The past requests may include textual fields representing a description of the incoming request, a requesting entity, or a priority of the incoming request, wherein the machine-learning model was trained with at least the textual fields as input.

In some embodiments, selecting the particular server comprises determining that the particular server has a greatest time remaining of all of the servers that have times remaining that are greater than the expected duration.

In some embodiments, selecting the particular server comprises determining that the particular server has a least time remaining of all of the servers that have times remaining that are greater than the expected duration.

In some embodiments, the servers are physical computing devices.

In some embodiments, the servers are virtual server devices configured to execute on a platform of one or more physical computing devices, wherein the deactivation times indicate when the virtual server devices are scheduled to be spun down.

In some embodiments, the servers are human agents, and wherein the deactivation times indicate when the human agents are scheduled to end their shifts.

In some embodiments, the particular server is one in a plurality of server groups, wherein calculating the times remaining in service for each of the servers comprises calculating the times remaining in service for each of the servers in the server groups, and wherein selecting the particular server comprises choosing the particular server over all candidate servers in the server groups that have times remaining that are greater than the expected duration.

In some embodiments, the servers are disposed across a first server group and a second server group, wherein the particular server is disposed within the second server group, and wherein selecting the particular server comprises: (i) determining that all candidate servers in the first server group have times remaining that are less than the expected duration; and (ii) choosing the particular server from the second server group. The first server group and the second server group may be in different geographical locations.

VII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    persistent storage containing definitions of a set of queues and a set of servers, wherein the set of queues are configured to store incoming requests, and wherein the set of servers are respectively associated with deactivation times at which they are to be removed from service; and
    one or more processors configured to:
        identify, by an assignment engine, an incoming request in a particular queue of the set of queues, wherein the incoming request is ready for assignment to one of the set of servers;
        determine, by the assignment engine and based on data associated with the incoming request, an expected duration for servicing of the incoming request, wherein the expected duration is based on output from a machine-learning model, wherein the machine-learning model was trained with past requests that were respectively labelled with actual servicing durations, wherein the machine-learning model predicts the expected duration based on the past requests as labelled, wherein the past requests include textual fields representing a description of the incoming request, a requesting entity, or a priority of the incoming request, and wherein the machine-learning model was trained with at least the textual fields as input;
        calculate, by the assignment engine and based on the deactivation times, times remaining in service for each of the set of servers;
        select, by the assignment engine and from the set of servers, a particular server that has a time remaining that is greater than the expected duration; and
        assign, by the assignment engine, the incoming request to the particular server.

2. The system of claim 1, wherein the expected duration is based on a priority of the incoming request or an importance associated with the particular queue.

3. The system of claim 1, wherein selecting the particular server comprises:
    determining that the particular server has a greatest time remaining of all of the set of servers that have times remaining that are greater than the expected duration.

4. The system of claim 1, wherein selecting the particular server comprises:
    determining that the particular server has a least time remaining of all of the set of servers that have times remaining that are greater than the expected duration.

5. The system of claim 1, wherein the set of servers are physical computing devices.

6. The system of claim 1, wherein the set of servers are virtual server devices configured to execute on a platform of one or more physical computing devices, and wherein the deactivation times indicate when the virtual server devices are scheduled to be spun down.

7. The system of claim 1, wherein the set of servers are human agents, and wherein the deactivation times indicate when the human agents are scheduled to end their shifts.

8. The system of claim 1, wherein the particular server is one in a plurality of server groups, wherein calculating the times remaining in service for each of the set of servers comprises calculating the times remaining in service for candidate servers in the server groups, and wherein selecting the particular server comprises choosing the particular server over all the candidate servers in the server groups that have times remaining that are greater than the expected duration.

9. The system of claim 1, wherein the set of servers are disposed across a first server group and a second server group, wherein the particular server is disposed within the second server group, and wherein selecting the particular server comprises:
    determining that all candidate servers in the first server group have times remaining that are less than the expected duration; and
    choosing the particular server from the second server group.

10. The system of claim 9, wherein the first server group and the second server group are in different geographical locations.

11. A computer-implemented method comprising:
    identifying, by an assignment engine, an incoming request in a particular queue of a set of queues, wherein the incoming request is ready for assignment, wherein persistent storage contains definitions of the set of queues and a set of servers, wherein the set of queues are configured to store incoming requests, and wherein the set of servers are respectively associated with deactivation times at which they are to be removed from service;
    determining, by the assignment engine and based on data associated with the incoming request, an expected duration for servicing of the incoming request, wherein the expected duration is based on output from a machine-learning model, wherein the machine-learning model was trained with past requests that were respectively labelled with actual servicing durations, wherein the machine-learning model predicts the expected duration based on the past requests as labelled, wherein the past requests include textual fields representing a description of the incoming request, a requesting entity, or a priority of the incoming request, and wherein the machine-learning model was trained with at least the textual fields as input;
    calculating, by the assignment engine and based on the deactivation times, times remaining in service for each of the set of servers;
    selecting, by the assignment engine and from the set of servers, a particular server that has a time remaining that is greater than the expected duration; and
    assigning, by the assignment engine, the incoming request to the particular server.

12. The computer-implemented method of claim 11, wherein the set of servers are virtual server devices configured to execute on a platform of one or more physical computing devices, and wherein the deactivation times indicate when the virtual server devices are scheduled to be spun down.

13. The computer-implemented method of claim 11, wherein the set of servers are human agents, and wherein the deactivation times indicate when the human agents are scheduled to end their shifts.

14. The computer-implemented method of claim 11, wherein the particular server is one in a plurality of server groups, wherein calculating the times remaining in service for each of the set of servers comprises calculating the times remaining in service for candidate servers in the server groups, and wherein selecting the particular server comprises choosing the particular server over all the candidate servers in the server groups that have times remaining that are greater than the expected duration.

15. The computer-implemented method of claim 11, wherein the set of servers are disposed across a first server group and a second server group, wherein the particular server is disposed within the second server group, and wherein selecting the particular server comprises:
    determining that all candidate servers in the first server group have times remaining that are less than the expected duration; and
    choosing the particular server from the second server group.

16. An article of manufacture including a non-transitory computer-readable medium, having stored thereon program instructions that, upon execution by a computing system, cause the computing system to perform operations comprising:
    identifying, by an assignment engine, an incoming request in a particular queue of a set of queues, wherein the incoming request is ready for assignment, wherein persistent storage of the computing system contains definitions of the set of queues and a set of servers, wherein the set of queues are configured to store incoming requests, and wherein the set of servers are respectively associated with deactivation times at which they are to be removed from service;
    determining, by the assignment engine and based on data associated with the incoming request, an expected duration for servicing of the incoming request, wherein the expected duration is based on output from a machine-learning model, wherein the machine-learning model was trained with past requests that were respectively labelled with actual servicing durations, wherein the machine-learning model predicts the expected duration based on the past requests as labelled, wherein the past requests include textual fields representing a description of the incoming request, a requesting entity, or a priority of the incoming request, and wherein the machine-learning model was trained with at least the textual fields as input;
    calculating, by the assignment engine and based on the deactivation times, times remaining in service for each of the set of servers;
    selecting, by the assignment engine and from the set of servers, a particular server that has a time remaining that is greater than the expected duration; and
    assigning, by the assignment engine, the incoming request to the particular server.

17. The article of manufacture of claim 16, wherein selecting the particular server comprises:
    determining that the particular server has a greatest time remaining of all of the set of servers that have times remaining that are greater than the expected duration.

18. The article of manufacture of claim 16, wherein selecting the particular server comprises:
    determining that the particular server has a least time remaining of all of the set of servers that have times remaining that are greater than the expected duration.

19. The article of manufacture of claim 16, wherein the set of servers are virtual server devices configured to execute on a platform of one or more physical computing devices, and wherein the deactivation times indicate when the virtual server devices are scheduled to be spun down.

20. The article of manufacture of claim 16, wherein the set of servers are human agents, and wherein the deactivation times indicate when the human agents are scheduled to end their shifts.

* * * * *